Figure 1:
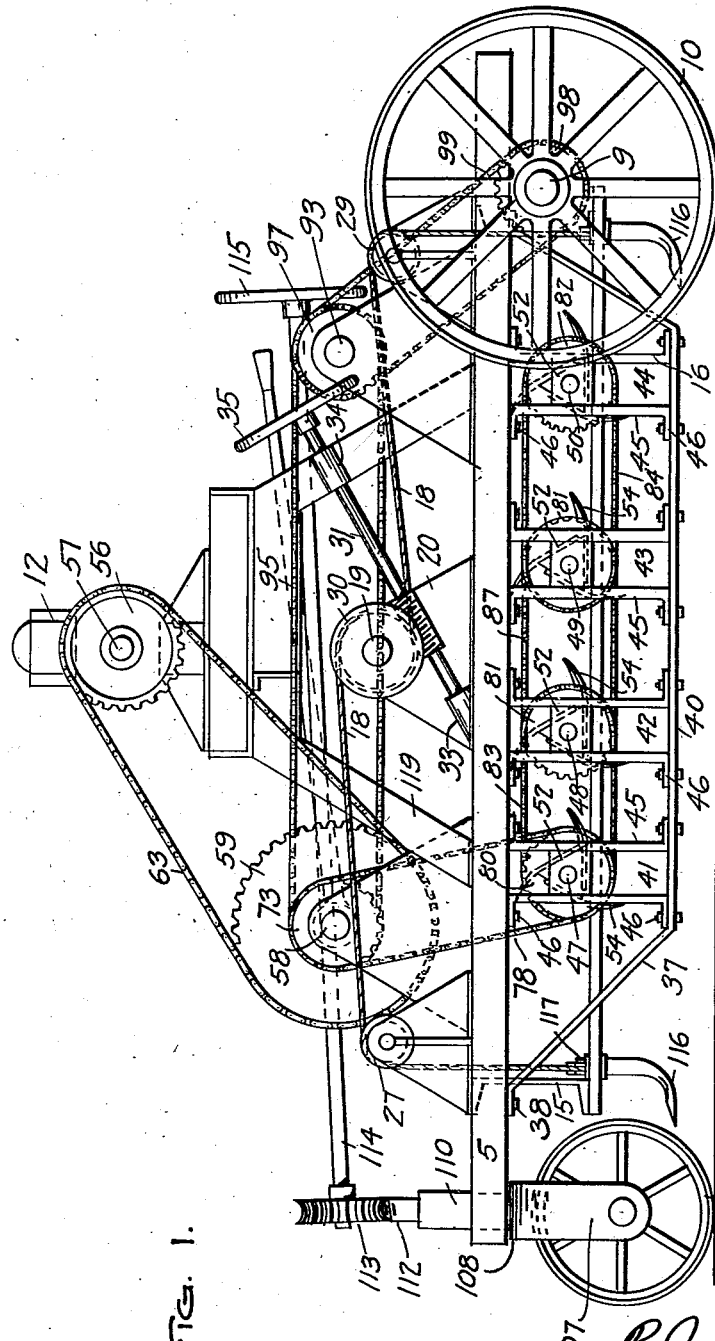

Jan. 8, 1924.

R. J. O'NEILL 1,480,411

ROTARY PLOW AND CULTIVATOR

Filed June 17, 1921  3 Sheets-Sheet 1

INVENTOR:
R. J. O'Neill
BY
ATTORNEY.

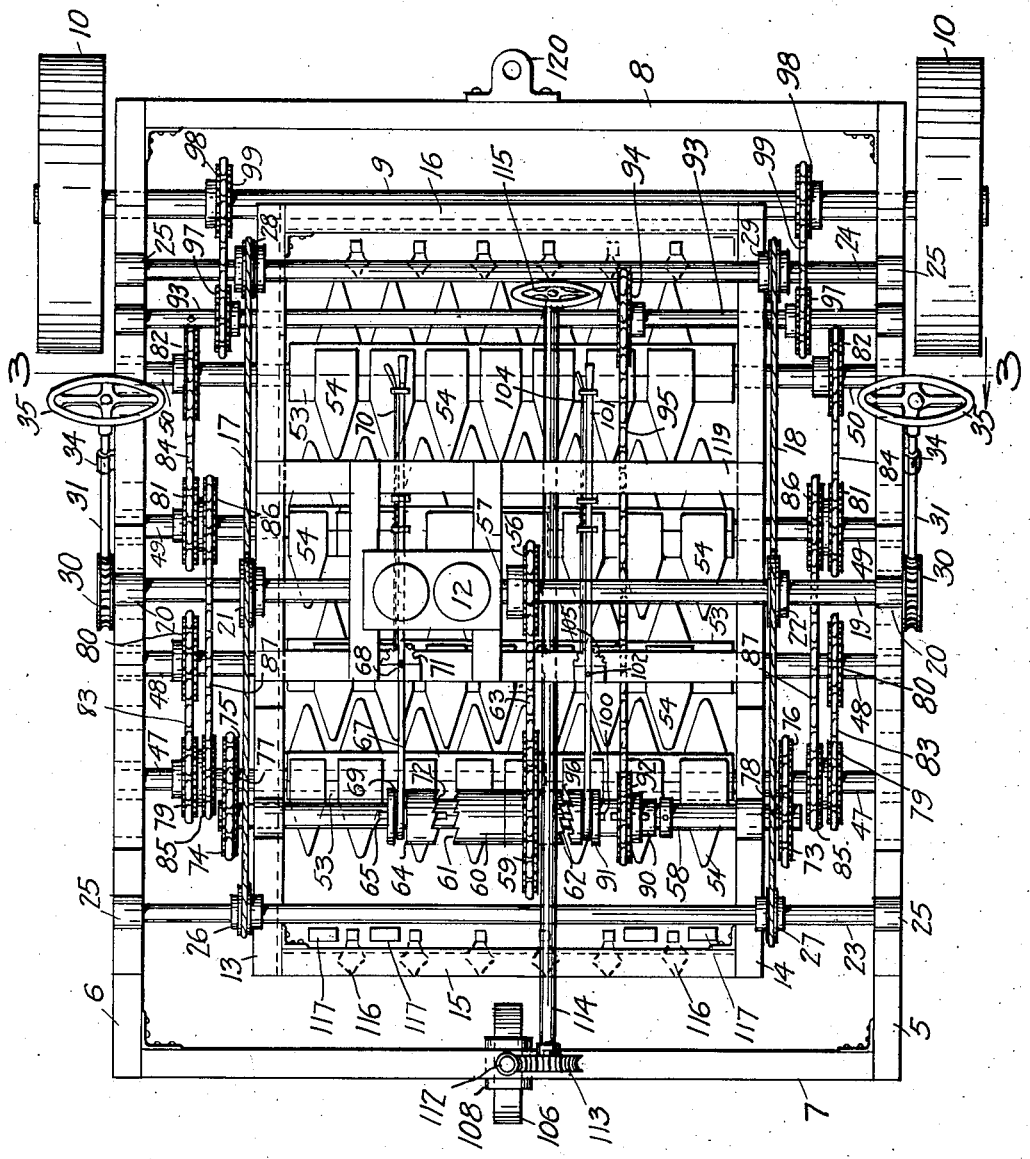

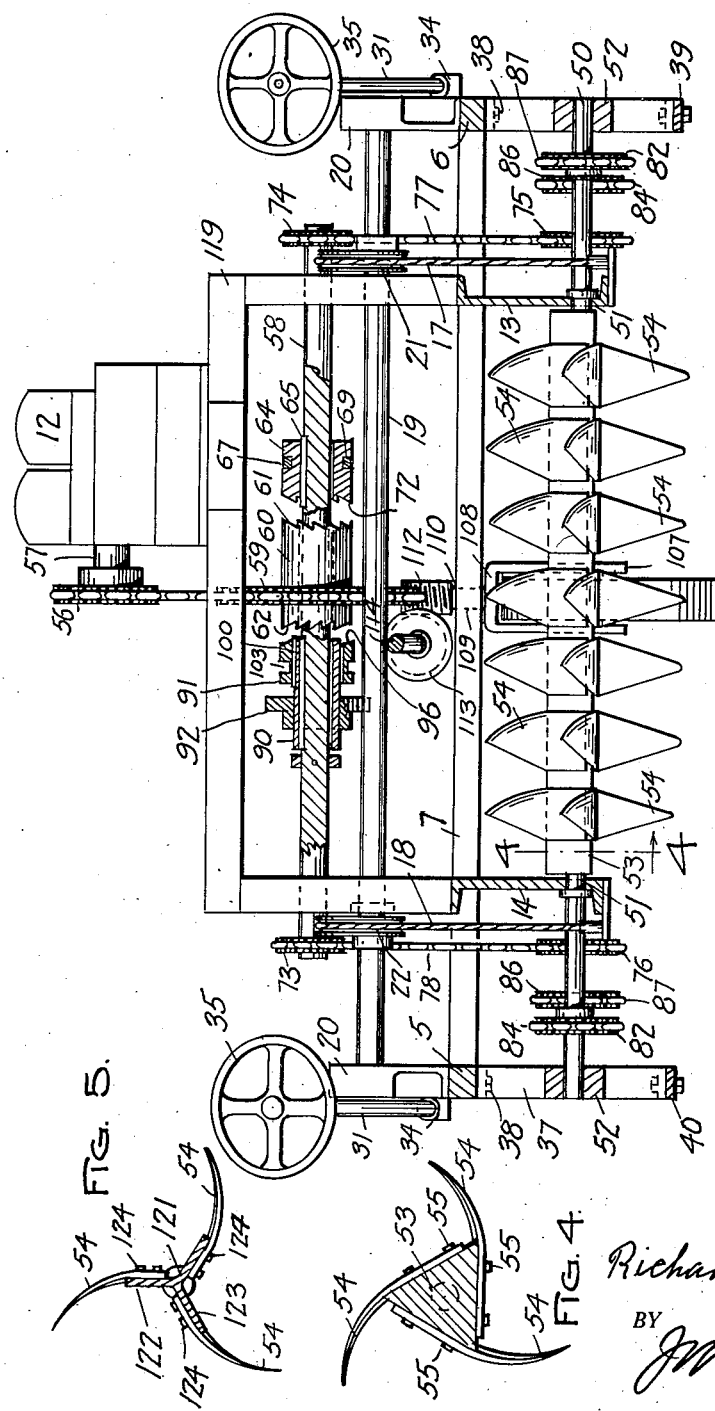

Patented Jan. 8, 1924.

1,480,411

UNITED STATES PATENT OFFICE.

RICHARD J. O'NEILL, OF DENVER, COLORADO.

ROTARY PLOW AND CULTIVATOR.

Application filed June 17, 1921. Serial No. 478,301.

*To all whom it may concern:*

Be it known that RICHARD J. O'NEILL, citizen of the United States, and resident of the city and county of Denver and State of Colorado, has invented certain new and useful Improvements in Rotary Plows and Cultivators, of which the following is a full and exact description, such as will enable others skilled in the art to which the invention appertains to make and use the same.

My invention relates to improvements in rotary plows and cultivators; and the invention has for its object the provision of a machine of this character adapted to carry the plows or other implements upon the frame of the tractor instead of trailing the same, as is most usual in tractors.

Another object of the invention is to provide a tractor specially designed for carrying plows, or other implements used in the preparation of ground for planting crops.

Another object of the invention is to provide a power operable machine which will dig up the ground instead of making a furrow or turning the earth to one side as is usual in most machines of this character.

Another object of the invention is to provide a machine of this class embodying a construction whereby a series of implements are caused to rotate and dig into the earth in substantially the same manner it would be manually dug up by a spade or shovel.

Another object of the invention is to provide a machine of the class described embodying a vertically movable implement carrying frame, whereby when it is not desired to use the plows, or implements, the frame may be raised so as to elevate the said implements out of contact with the ground.

Another object of the invention is to provide a compact and easily operable tractor specially designed for carrying and operating implements for breaking and preparing ground for agricultural purposes.

With these and other objects in view, the invention will now be described in detail with reference to the accompanying drawings, which form a part hereof.

In these drawings, Figure 1 is a side elevation view of the motor plow; Figure 2 is a top plan view of the same; Figure 3 is a cross sectional view of the motor plow, taken on the line 3—3 of Figure 2; and Figure 4 is a cross sectional view of one of the implement carrying shafts, taken on the line 4—4 of Figure 3; and Figure 5 is a detailed view of a modified form of implement carrying shaft.

Corresponding and like parts are referred to in the following description and indicated in all the views of the accompanying drawings by the same reference characters.

The numerals 5 and 6 represent opposite side frame rails of the motor plow frame, the same being connected by end rails 7 and 8. A shaft 9 is journaled in the side rails 5 and 6, upon which is mounted ground wheels 10. Power is transmitted to the shaft 9 and in turn to the ground wheels 10 by means of a motor 12, as will later be more fully explained.

The following members compose a movable frame:—13 and 14 are spaced apart side rails, and 15 and 16 are the end rails, which connect and space apart the side rails. This movable frame is arranged between the frame rails 5 and 6, and the said movable frame is supported upon and carried by the frame rails 5 and 6 by means of cables 17 and 18. A shaft 19 is journaled in the side frame rails 5 and 6, as shown at 20, and pulleys 21 and 22 are secured to said shaft 19 respectively on the exterior sides of the frame rails 13 and 14. The cables 17 and 18 respectively pass around these pulleys 21 and 22 and extend in opposite directions from said pulleys, whereby operation of said pulleys will cause said cables to be either wound upon or off of said pulleys in both directions. Shafts 23 and 24 are journaled upon the side rails 5 and 6, as shown at 25. Sheaves 26 and 27 are mounted upon the shaft 23 and rotate with the latter, and sheaves 28 and 29 are mounted upon the shaft 24 and rotate therewith. The cable 17 passes from the pulley 21 in opposite directions and over the sheaves 26 and 28, and the cable 18 passes from the pulley 22 in opposite directions and over the sheaves 27 and 29. The extremities of both cables depend from the sheaves 26 and 27 and 28 and 29 and connect with the side rails 13 and 14 of the movable frame. A worm wheel 30 is mounted upon each extremity of the shaft 19, and operating shafts 31 mesh with said worm wheels, a worm 32 being mounted on each of said operating shafts 31 which engage with said worm wheels 30. These shafts 31 are respectively journaled upon the side rails 5 and 6, as shown at 33 and 34, and are provided with steering wheels 35, by means of which the shafts 31 are rotated. Rotation of these shafts 31 will transmit power to the shaft 19, causing the latter to rotate and rotate the pulleys 21 and 22 therewith, thereby causing the cables 17 and 18 to be either wound upon or off of said pulleys. When the shaft 19 is rotated in the direction to wind the cables 17 and 18 thereon, the inner, or movable frame will be elevated through the medium of said cables, and lowered when said shaft 19 is rotated in the direction to unwind said cables from said pulleys.

Tressels 36 and 37 are respectively carried by the side rails 5 and 6 of the motor plow frame, said tressels depending below said side rails and secured to the latter at their extremities, as shown at 38. These tressels are provided with horizontal parts 39 and 40 respectively, upon which four pair of guide bars are mounted, said guide bars being designated by pairs, as follows:—41, 42, 43 and 44. It will be understood that there are four pair of these guide bars on each of the horizontal parts 39 and 40 of the tressels 36 and 37, and that each pair correspond with a pair on the opposite tressel. The bars composing the pairs of guide bars are designated 45, and they are respectively secured at their lower and upper extremities to the tressels 39 and 40 and side rails 5 and 6, as shown at 46.

Shafts 47, 48, 49 and 50 are journaled in the side rails 13 and 14 of the movable frame, as shown at 51, and the extremities of these shafts extend beyond the said side rails of the movable frame and are journaled in cross-heads 52, one of which is arranged in each pair of guide bars, or between two of said bars 45. Thus, said shafts 47, 48, 49 and 50 are vertically movable so that they may be carried by the movable frame in which said shafts are fixedly journaled.

The intermediate portion of each shaft 47, 48, 49 and 50 is of triangular shape, as shown at 53. (See Fig. 4.) This triangular portion of said shafts enables three plows, or implements 54 to be secured thereto and to radially project from the same. Stud bolts 55 project from said triangular portion and pass through the plows or implements, thereby firmly securing said plows, or implements to the shafts 47, 48, 49 and 50. It will be seen that three of these plows are arranged in pairs throughout the length of said triangular portions, and that said shafts are triangular in cross section throughout their length between the side rails 13 and 14 of the movable frame. As these shafts pass through the said side rails 13 and 14, they are then round or tubular, thereby enabling them to be journaled, as above described.

From the foregoing description, it will be understood that the purpose of raising and lowering the movable frame is to disengage and engage the plows 54 from and with the ground. In other words, when the machine is being moved from one location to another, the said plows are disengaged from the ground by raising the frame in the manner heretofore described, and when it is desired for the plows to perform their work, the movable frame is lowered.

I will now proceed to describe the manner in which power is transmitted from the motor 12 to the various shafts 47, 48, 49, and 50.

A sprocket wheel 56 is mounted upon a shaft 57 of the motor 12. A driven shaft 58 is journaled in the side members 13 and 14 of the movable frame, and a sprocket wheel 59 is mounted upon this driven shaft 58. The sprocket wheel 59 is provided with a hub 60, the said sprocket wheel being mounted upon said hub 60, and the opposite extremities of this hub 60 are provided with clutch teeth 61 and 62 respectively. A chain 63 connects the sprocket wheel 56 with the sprocket wheel 59 and through the medium of which power is transmitted from the motor 12 to the driven shaft 58. It is understood that the hub 60 is mounted upon the driven shaft 58 so that the same will rotate upon said shaft when it is not connected through the medium of the clutch now to be described. A clutch block 64 is splined upon the driven shaft 58, as shown at 65, whereby the same is longitudinally movable upon the driven shaft 58. A clutch lever 67 is pivoted upon the machine, as shown at 68, one extremity of said clutch lever 67 being engageable in a groove 69 of the clutch block 64, and the other extremity of said clutch lever 67 is adapted to be manually operated for the purpose of shifting said clutch block 64 upon the driven shaft 68. The lever 67 is of ordinary construction and is adapted to be locked in its adjusted position by means of the usual latch 70 and sector 71. One face of the clutch block 64 is provided with teeth 72 adapted to intermesh with the teeth 61 of the hub 60. Thus, when the clutch block 64 is shifted into engagement with the hub 60, the latter is locked so that it will not rotate independently of the driven shaft 58, but the shaft 58 will be caused to rotate with the hub 60 when power is transmitted to the latter. The driven shaft 58 is extended at its extremities beyond its bearings in the side members 13 and 14 to the outer sides of said members, and sprocket wheels 73 and 74 are mounted upon the extremities of said driven shaft 58 on the outer sides respectively of the side members 13 and 14. Sprocket wheels 75 and 76 are mounted upon the shaft 47 exteriorly of the side members 13 and 14 and sprocket chains 77 and 78 respectively connect the sprocket wheels 73 and 74 with the sprocket wheels 75 and 76. The shafts 47, 48, 49 and 50 are provided with sprocket wheels respectively designated 79, 80, 81 and 82, a similar sprocket wheel being mounted at each extremity of each one of said shafts between the inner frame and the outer frame, and the same reference characters having been given to all of said sprocket wheels. The sprocket wheels 79 and 80 are connected by means of sprocket chains 83, and the sprocket wheels 81 and 82 are connected by means of sprocket chains 84. Sprocket wheels 85 and 86 are mounted respectively upon the shafts 47 and 49, there being one of the sprocket wheels on each extremity of said shaft on the exterior of the side members 13 and 14, and these sprocket wheels are connected by means of sprocket chains 87. Thus, it will be seen that power is transmitted initially from the motor 12 to the shaft 47 through the instrumentalities heretofore described, and by reason of the transmission mechanism above described, all of the shafts 47, 48, 49 and 50 are caused to rotate in the same direction, and, of course, causing the plows 54 to dig into the ground.

A sleeve 90 is mounted upon the driven shaft 58 so that the same will slide longitudinally thereon and a clutch block 91 is mounted upon said sleeve 90 and rotates with the latter. A sprocket wheel 92 is also mounted upon said sleeve 90 and rotates with the latter. A counter shaft 93 is journaled in the side members 5 and 6 of the outer frame, and a sprocket wheel 94 is mounted on said counter shaft 93 and connects with the sprocket wheel 92 by means of a sprocket chain 95. The clutch block 91 is provided with teeth 96 which are adapted to engage with the teeth 62 of the hub 60, thereby connecting the sleeve 90 to rotate with the hub 60 and as a consequence transmit power through the sprocket wheel 92, sprocket chain 95, sprocket wheel 94 to the counter shaft 93. Sprocket wheels 97 are mounted upon the counter shaft 93 on the exterior of the side members 13 and 14 of the movable frame, and these sprocket wheels 97 are connected with sprocket wheels 98 which are mounted upon the rear axle 9 by means of sprocket chains 99. Thus, through the transmission mechanism described in the foregoing, power is transmitted from the motor 12 to the ground wheels 10 of the motor plow, thereby supplying tractive power to the entire machine and causing the latter to move over the ground. The sleeve 90 is, of course, journaled upon the shaft 58 and may, therefore, be caused to rotate independently of the shaft 58 for the supplying of the tractive power of the machine. The clutch block 91 is splined upon the sleeve 90, as shown at 100, so that said clutch block may be moved longitudinally upon the sleeve 90 into and out of mesh of the hub 60 of the sprocket wheel 59. The clutch block 91 is operated by means of a lever 101 which is pivoted, as shown at 102. One extremity of this lever 101 engages in a groove 103 of the clutch block 91, and the other extremity of said lever 101 is adapted to be manually operated for shifting the clutch block 91 into and out of engagement. This lever 101 is of the ordinary construction and is provided with the usual latch 104 which is adapted to engage with a sector 105 for locking said lever in any desired position of adjustment. Now, when the teeth 96 of the clutch block 91 are in mesh with the teeth 62 of the hub 60, the sleeve 90 will be caused to rotate, thereby rotating the sprocket wheel 92 therewith and transmitting power to the ground wheels 10 of the machine through the transmission mechanism heretofore described. From the foregoing description, it will be understood that tractive power may be supplied to the ground wheels 10 without operating the shafts 47, 48, 49 and 50. In other words, these shafts may be permitted to remain idle while the machine is being moved from one location to another. When such is the case, the clutch block 64 will, of course, be disengaged from the hub 60 and power will not be transmitted to the driven shaft 58, but the sleeve 90 caused to rotate upon said driven shaft.

The end bar 7 of the outer frame is provided with a steering wheel 106. Said steering wheel 106 is journaled in a bifurcation 107 of a member 108. This member 108 is journaled in the end rail 7, as shown at 109, by means of a stem 110, which passes through the end rail 7 and extends above the latter. The stem 110 of said member 108 is provided with a worm 112 thereon, which meshes with a worm wheel 113. This worm wheel 113 is fixed on one extremity of a steering shaft 114. The other extremity of this steering shaft 114 is provided with a hand operating wheel 115 thereon by means of which the shaft 114 is actuated. By changing the angle of the wheel 106 through operation of the steering shaft 114 as is obvious, the direction of travel of the machine will be accordingly changed.

Both of the end rails 15 and 16 of the movable frame may carry plows, or other implements 116, or, if desired, these plows or implements may be left off entirely. It is, however, preferable to employ a plow or other implement for these end rails 15 and 16 of the character shown in the drawings, as these plows have a tendency to hold the movable frame down and cause the plows of the rotating shafts 47, 48, 49 and 50 to dig into the ground. It is understood in this connection that these plows may be arranged upon the said rails 15 and 16 or in any other suitable location in staggered relation or so that one will, in a manner, follow the others.

Weights 117 are adapted to be applied to the end rail 15 and held thereon in any suitable manner, whereby the necessary weight is applied to the front part of the movable frame for weighting the latter down to cause the plows to dig into the ground. These weights may be varied in accordance with the character of the ground being broken.

A coupling 120 is secured to the end rail 8 of the outer frame, whereby other implements, such as a harrow, may be secured thereto.

In Figure 5, I have shown the modified form of fastening the plows 54 to the various shafts 47, 48, 49 and 50. This modified form resides in the construction of these shafts between the side rails 13 and 14 of the movable frame, such construction residing in the provision of three wings 121, 122 and 123 radiating from the axis of said shafts and to which wings the plows 54 are secured by means of bolts 124.

The use and operation of the machine has been described throughout the foregoing description in connection with the description of the various mechanical parts thereof, and it is believed unnecessary to go further into the operation of the machine.

While I have described and illustrated herein a specific form of my invention, it is understood that the invention is not limited thereto and that the same may be modified and varied without departing from the spirit of the invention or the scope of the appended claims.

Having thus described the invention, what I claim and desire to obtain by Letters Patent, is:—

1. In a motor plow, the combination with a main frame having an auxiliary plow-carrying frame suspended therein for vertical adjustment, of rotary plow-carrying shafts journaled in each side member of said auxiliary frame and extending to engagement with vertically-slidable crossheads carried on said main frame.

2. In a motor plow, the combination with a main frame having an auxiliary plow-carrying frame suspended therein for vertical adjustment, of rotary plow-carrying shafts journaled in each side member of said auxiliary frame and extending to engagement with vertically-slidable crossheads carried on said main frame, said shafts being triangular in cross section where they pass through said auxiliary frame, and plow blades secured to the three sides of said triangular portions.

3. In a motor plow, the combination with a main frame having an auxiliary plow carrying frame suspended therein, of rotary plow carrying shafts journaled in each side member of said auxiliary frame and extending to engagement with vertically slidable crossheads carried on said main frame and stationary plows or harrows secured to said auxiliary frame.

4. In a motor plow the combination with a main frame having an auxiliary rotary plow carrying frame vertically, adjustably, suspended therein, of a driving motor mounted on said auxiliary frame and adapted to rotate said plows; bearings in said auxiliary frame for the shafts of said plows, said shafts extending beyond said bearings at each side of said auxiliary frame; a tressel suspended below each side bar of said main frame and vertically slidable crossheads mounted in said tressels and engaging said shaft extensions so as to pass the stress of the drag and pull of said plows to said main frame.

In testimony whereof, I affix my signature.

RICHARD J. O'NEILL.